United States Patent [19]

Bezner

[11] 4,352,772

[45] Oct. 5, 1982

[54] METHOD AND APPARATUS FOR INJECTION-MOLDING A MANIFOLD ONTO A SET OF HOLLOW ELEMENTS

[75] Inventor: Baruch J. Bezner, Tel Aviv, Israel

[73] Assignee: Helioset Advanced Technologies Ltd., Tel Aviv, Israel

[21] Appl. No.: 167,643

[22] Filed: Jul. 11, 1980

[30] Foreign Application Priority Data

Jul. 26, 1979 [IL] Israel ........................................ 57898

[51] Int. Cl.³ ............................ B29C 6/04; B29C 1/06
[52] U.S. Cl. ...................................... 264/229; 249/63; 249/145; 249/177; 264/250; 264/251; 264/252; 264/254; 264/255; 264/275; 264/277; 264/334; 425/116; 425/123; 425/468; 425/577
[58] Field of Search ............... 264/254, 261, 277, 278, 264/229, 250, 251, 252, 275, 334; 249/145, 63, 177, 180; 425/116, 123, 468, 577

[56] References Cited

U.S. PATENT DOCUMENTS

| | | | |
|---|---|---|---|
| 1,465,222 | 8/1923 | Kirton | 249/145 |
| 3,081,497 | 3/1963 | Scherrz | 264/277 |
| 3,362,302 | 1/1968 | Friedman | 425/116 |
| 3,618,170 | 11/1971 | Owens | 425/468 |
| 3,643,805 | 2/1972 | Hoffman | 264/277 |
| 3,784,665 | 1/1974 | Keefe | 264/261 |
| 3,865,666 | 2/1975 | Shoney | 264/254 |

Primary Examiner—James B. Lowe

[57] ABSTRACT

The invention provides a method and apparatus for injection-molding at least a first part of a plastics manifold element onto an extruded, panel-forming plurality of juxtaposed, hollow elements, comprising the steps of introducing into one set of ends of the hollow elements protrusions which extend from a core defining the shape of at least part of the interior space of the final manifold to be formed; clamping the region of the set of ends accommodating the protrusions between first and second mold members which, together with the core delimit the cavity of at least part of the final manifold; injecting plastic material into the cavity; and removing the core, and the mold members, whereby a strong bond is formed between the hollow elements and the manifold.

12 Claims, 14 Drawing Figures

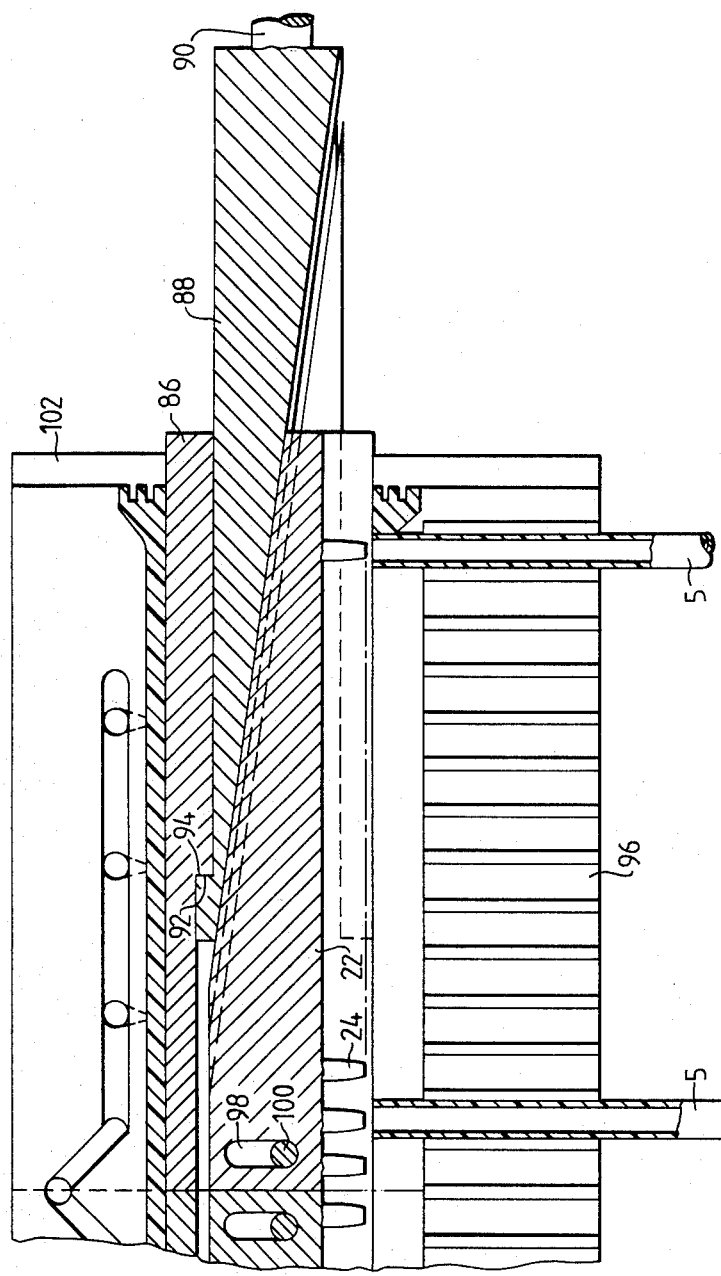

METHOD AND APPARATUS FOR INJECTION-MOLDING A MANIFOLD ONTO A SET OF HOLLOW ELEMENTS

The present invention relates to a method for injection-molding a plastics manifold onto an extruded, panel-forming plurality of juxtaposed, hollow elements. It also relates to an apparatus for injection-molding such as plastics manifold onto such an extruded, panel-forming plurality of juxtaposed, hollow elements.

While the extrusion process is basically very simple and the tooling required (i.e., extrusion dies) much cheaper than comparable injection-molding dies, products are limited by the very principle underlying the extrusion process: cross sections, determined by the die, cannot vary at any point along the extruded component. Parts which must have local projections or raised sections extending across the direction of extrusion simply cannot be produced by this method. Yet if the major section of such products was extrudable, it is often economical to produce such projections or transversal sections by different methods, e.g., injection-molding, and to attach them to the extruded main body by any of the available joining methods, which include mechanical fastening by means of screws or rivets, adhesive bonding, and welding.

The first method has only limited applicability, because of the high local stresses involved, which may cause cracking. This method is also not applicable where tightly sealed joints are required.

Adhesive bonding is very frequently used and, generally, gives good results. However, in order to obtain reliable joints, all thermoplastics first require a thorough cleaning and light abrading of the surfaces to be bonded, as the plastic processing agents generally present on plastic surfaces, such as mold-release agents, lubricants and plasticizers will usually prevent proper wetting by the adhesive. Also, highest bond strengths are achieved only if the surfaces are first chemically altered to a more highly polar state.

While welding techniques can usually dispense with these preparatory stages, to produce a neat, flawless welding seam requires considerable skill, especially if there are large differences in thickness between the parts to be joined by welding.

The above disadvantages and limitations apply naturally also to the joining of two parts, both of which were produced by injection-molding.

It is one of the objects of the present invention to overcome the above-mentioned difficulties and limitations and to propose a method permitting the injection-molding of plastics components onto extruded components, or onto other injection-molded components, more specifically, the injection-molding of at least a first part of a plastics manifold element onto an extruded, panel-forming plurality of juxtaposed, hollow elements, whereby the joint obtained is of a mechanical strength equaling the strength of the base materials.

This object the invention achieves by providing a method for injection-molding at least a first part of a plastics manifold element onto an extruded, panel-forming plurality of juxtaposed, hollow elements, comprising the steps of:

introducing into one set of ends of said plurality of hollow elements protrusion means extending from a core means, said core means defining the shape of at least part of the interior space of the final manifold to be formed;

clamping the region of said set of ends accommodating said protrusion means between a first and a second mold member, which two members, together with said core means, delimit the cavity of at least part of said final manifold;

injecting plastic material into said cavity;

removing said core means, and removing said first and second mold members, whereby during the injection-molding process a strong bond is formed at the interface between the material of said plurality of juxtaposed, hollow elements and the material of the manifold being formed.

The invention further provides an apparatus for injection-molding a plastic manifold onto an extruded, panel-forming plurality of juxtaposed, hollow elements, which apparatus comprises at least one core means defining the shape of at least part of the interior space of the final manifold to be formed, further comprising protrusion means extending from said core means, which protrusion means is designed to substantially fit and fill at least one end section of said hollow elements to prevent the collapsing thereof during the injection-molding of said manifold thereon.

While the invention will now be described in connection with certain preferred embodiments, it will be understood that it is not intended to limit the invention to these particular embodiments. On the contrary, it is intended to cover all alternatives, modifications and equivalent arrangements as may be included within the scope of the invention as defined by the appended claims.

In the drawings:

FIG. 14 is a cross-sectional top view of the mold of FIG. 11, shown at the end of a first core-extraction stage.

Figure 1:
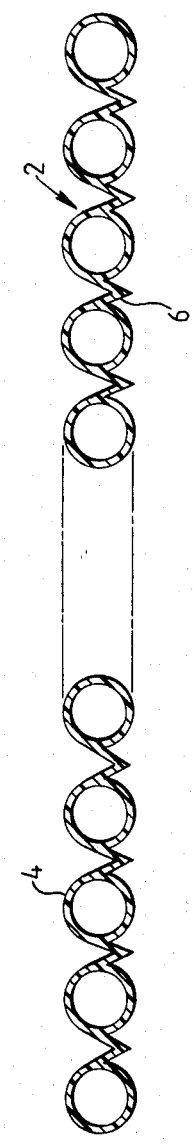
FIG. 1 is a cross-sectional view of a panel formed by a plurality of extruded, tubular elements connected to one another by a web extending in the longitudinal direction.

There is shown in FIG. 1 and extruded panel 2, cross-sectioned along a plane perpendicular to the direction of extrusion. This panel 2 is formed by a plurality of tubular elements 4 connected to one another by a web 6 extending in the longitudinal direction. The half-folded shape of the cross section of this web 6 permits the center distance of any pair of adjacent tubular elements 4 to be slightly varied in either direction by elastic deformation of the web which, as will be shown later, is of importance to the main stage of the method according to the invention. The material of this preferred embodiment of the panel 2 is preferably a UV-resistant nylon, with a typical wall thickness of 0.2 to 0.5 mm and a typical diameter of the tubular elements of 5 to 6 mm.

Another embodiment of the panel 2 simply consists of a plurality of the above-mentioned nylon tubing. While the basic tubular elements 5 of this embodiment are readily and cheaply manufactured, requiring no costly tools, their further processing by the method is more expensive than that of the embodiment shown in FIG. 1, as each tubular element 5 has to be separately inserted into the common mold. It is of course possible to use mechanical and even automatic loading devices which, for larger quantities, could make the separate element 5 a better economic proposition.

Figure 3:
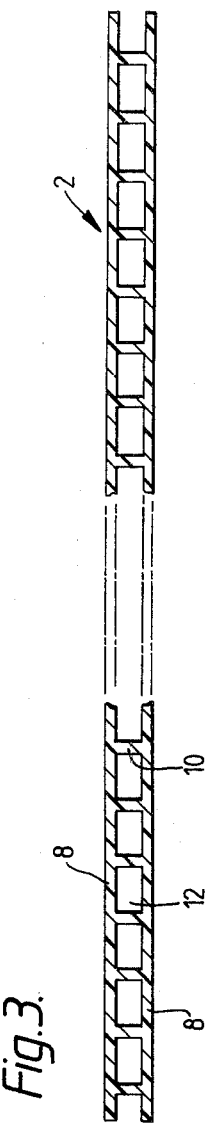
FIG. 3 is a cross-sectional view of a panel consisting of two sheets integrally connected by a plurality of spaced ribs.

FIG. 3 shows yet another possible embodiment of the panel 2, which consists of two sheets 8 integrally connected by a plurality of spaced ribs 10, enclosing between them hollow spaces 12. Similar to the embodiment of FIG. 1, this embodiment is extruded in one piece and has therefore the same advantage of easy handling. It lacks, however, the elastic-web feature of the embodiment of FIG. 1, which as will be explained below, is a certain disadvantage. It should be understood that the hollow spaces 12 need not be of a rectangular cross section as shown in FIG. 3, but could also be square, diamond-shaped, trapezoid, triangular, etc.

Figure 4:
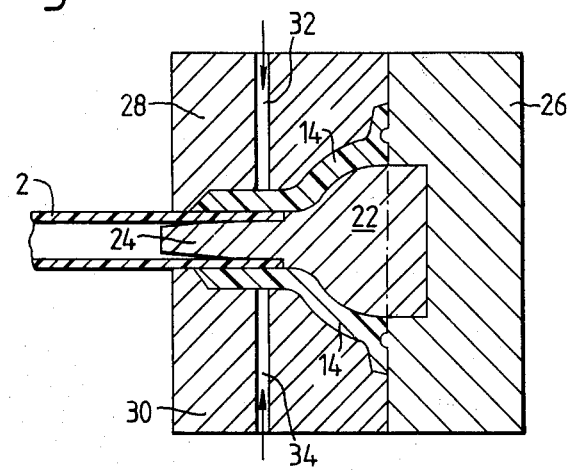
FIG. 4 illustrates a first sequence of the method according to the invention, as well as the apparatus involved.

FIG. 4 illustrates a first sequence of the method according to the invention, as well as the apparatus, whereby a first part 14 of a plastic manifold 16 (see FIG. 5) is injected-molded onto the panel 2 (of FIG. 1). To this end, the comb- or rake-like edge portion or protrusion 18 of a first core 20 (see FIG. 6), the body 22 of which defines the shape of at least part of the interior space of the final manifold, is introduced into one set of ends of the plurality of hollow elements constituting the panel 2. This comb-like protrusion 18 (FIG. 6) is formed of a plurality of teeth or fingers 24 of a cross section substantially equal to the cross section of the tubular elements 4, and slightly tapering over at least part of their length to facilitate introduction and withdrawal. The number of fingers 24 is obviously determined by the number of tubular elements 4 to the panel. The core 20 is also provided with a back-up member 26. In some configurations, the core 20 could be integral with the back-up member 26.

It is at this first stage that the elastic-web feature of the panel-forming tubular elements 4 becomes of importance. As the pitch (center distance) of the comb-like fingers 24 is fixed, the latter will enter the hollow elements constituting the panel 2 only if the pitch of these elements is identical with the pitch of the fingers 24. Now since the accuracy of the extrusion process is limited, there is liable to arise a cumulative pitch error which, when a larger number of such hollow elements is involved, will have grown to such an extent that, were the panel 2 totally rigid, at least some of the fingers 24 would no longer be in alignment with their associated hollow elements, thus preventing the entire set of fingers 24 from entering the panel 2. As it is, the above explained elastic-web feature will easily take care of such deviations.

Figure 2:
FIG. 2 is a cross-sectional view of a panel formed by a plurality of separate, nonconnected, extruded tubular elements.
Figure 6:
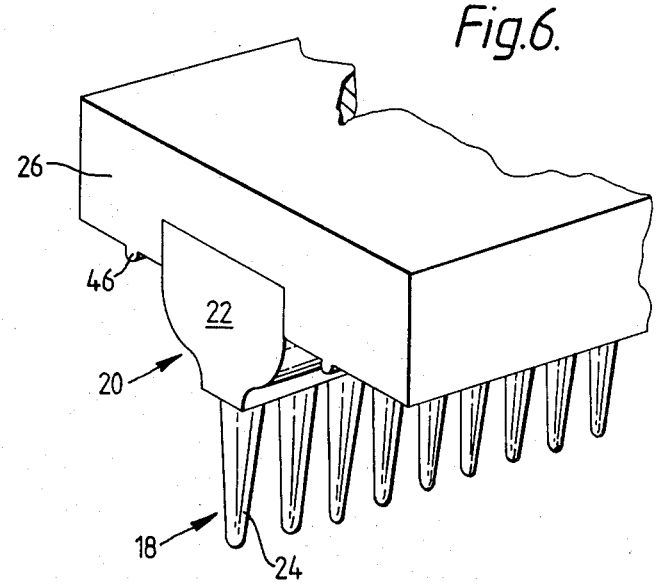
FIG. 6 is a perspective view of the first core and its back-up member, to be used for the panel embodiments of FIGS. 1 and 2.
Figure 7:
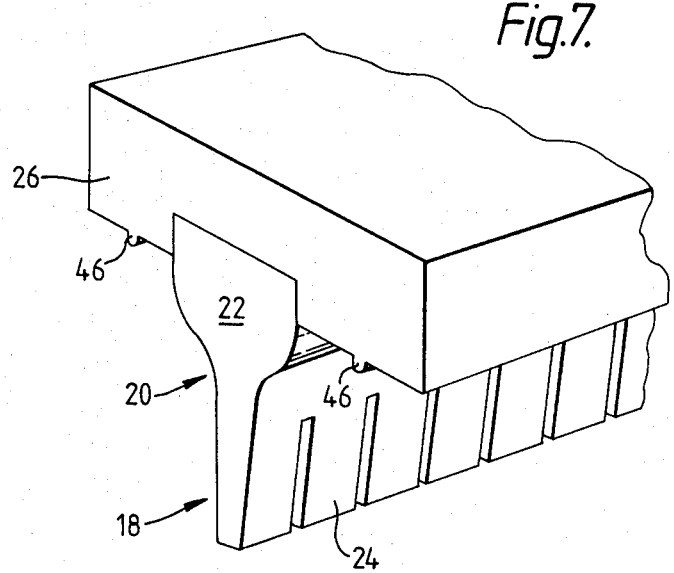
FIG. 7 is a perspective view of the first core and its back-up member, to be used for the panel embodiment of FIG. 3.

While this problem has thus been solved for the panel embodiment shown in FIG. 1 and obviously does not apply at all to the separate tubular elements 5 of the embodiment of FIG. 2, it definitely exists for the embodiment of FIG. 3, the appropriate first core for which is shown in FIG. 7 which, apart from the shape of the fingers 24, is identical to FIG. 6.

This problem can be solved in several ways, one of them would be the device of having the teeth 24, or at least small groups of such teeth, "float", so that reasonable errors of the above kind can be accommodated. A preferred solution consists in removing the ribs 10 in the zone of the comb-like protrusion 18 of the core 20 prior to the introduction of the latter. This wold not only solve the problem of cumulative error but, as during the later injection stage, these ribs would be "rebuilt" from the injected material of the manifold 16, gives the joint still greater strength. Another solution would be to merely cut loose the ends of the ribs 10 from their respective sheets 8. This would leave tongues, free at their outer (panel-edge) end, but still attached to their respective ribs at their inner end, which tongues would be elastic enough to accommodate the above errors. During injection, these cuts would be "repaired" by the injected material.

The first step, i.e., the introduction, into the tubular elements 4 of the panel 2, of the protrusion 18 having been accomplished, the next step prescribed by the method according to the invention is the clamping, between a first and a second mold member 28 and 30, respectively, of the edge formed by the tubular elements 4 of the panel 2. These two members 28 and 30, together with the core 20 and its back-up member 26, delimit the cavity of the first part 14 of the manifold 16.

The following step is the injection of plastic material into the above cavity, through runners 32 and 34, respectively. The high pressure and temperature of the injection-molding process causes a strong bond to be formed at the interface between the material of the panel 2 and the freshly injected material of the first part 14 of the manifold.

Subsequently, the core 20 and its back-up member 26 are withdrawn, and the first and second mold members 28 and 30 removed.

Figure 5:
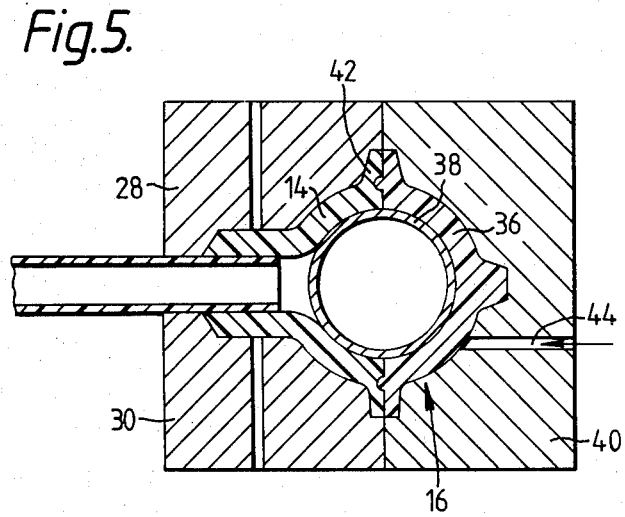
FIG. 5 illustrates a second sequence of the method according to the invention, as well as the apparatus involved.

What remains to be done now is to prepare, and attach, the second manifold part 36 (FIG. 5). While this can be obviously done by conventional methods, i.e., preparing the second manifold part 36, e.g., by extrusion, and attaching it to the first part 14 either by cementing or by welding, considering the above explained disadvantages and limitations of these conventional joining methods, the method according to the invention provides for a further sequence of steps, whereby the finished first part 14 is not removed from between the first and second mold members 28 and 30, or, if removed for production reasons, is again returned to this position, after which a second core 38 is introduced into the trough-like recess left by the first core 20. While a first portion of this second core 38 substantially fills this trough-like recess, a second portion of this second core 38 complements the body 22 of the first core 20 to define the shape of the complete interior space of the final manifold 16.

Next, a third mold member 40 is mounted (FIG. 5). Together with the above second portion of the second core 36 and with the faces 42 of the already molded first part 14 of the manifold 16, this mold member 40 delimits the cavity of the second part 36 of the manifold 16.

The following step is the injection of plastic material into this cavity through the runner 44. As with the previous injection step, the high pressure and temperature causes a complete fusing of the two parts 14 and 36 at the interface. An optional ridge feature 46 at the back-up plate 26 (FIG. 6), of which there can be several, produces corresponding grooves in the faces 42 of the first part 14, which increase the available contact surface and, after injection of the second part 36, provide added strength.

The final steps are the removal of the first, second and third mold members 28, 30 and 40, respectively, and the extraction of the second core 38.

While the method described hereinbefore gives entirely satisfactory results at a relatively modest investment in tooling, a preferred method according to the invention accomplishes the feat of injection-molding a plastics manifold onto the panel-forming hollow elements in a single injection step only, thereby reducing costs significantly, even if the initial outlay for tooling is higher.

Figure 8:
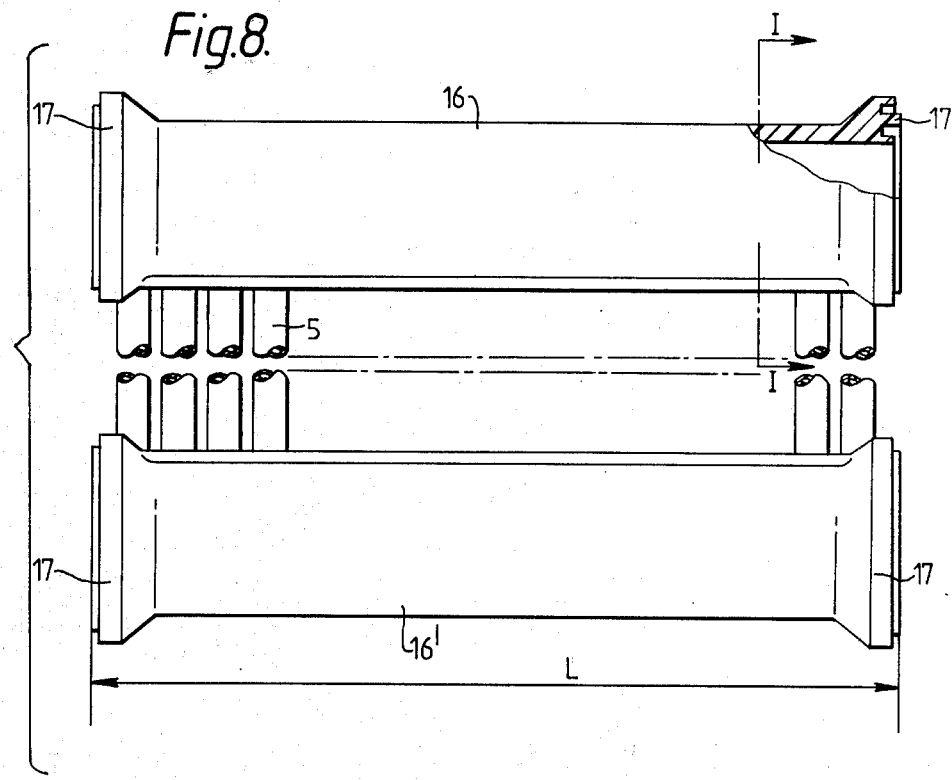
FIG. 8 is a front view, in partial cross section, of a basic-unit solar collector panel as produced by the method according to the invention.
Figure 9:
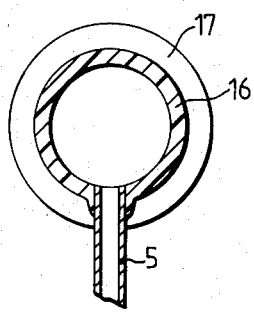
FIG. 9 is a cross section along plane I—I of FIG. 8.
Figure 10:
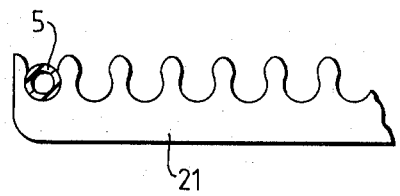
FIG. 10 is a frontal view of a spacer strip.

FIGS. 8 and 9 show the basic-unit solar collector panel produced by the preferred method according to the invention. Each basic unit consists of an upper manifold 16 and a lower manifold 16' which are injection-molded onto a plurality of juxtaposed extruded tubes 5 of optional length. For easier handling during the molding process as well as for stability and neatness of the finished panels, the tubes 5 are preassemble in one or several spacer strips 21 (FIG. 10) into which the tubes 5 may be snapped prior to molding of the manifolds 16. In order to keep tooling costs within reasonable limits, the length L of the basic-unit manifold 16 is held smaller than the width of the commonly used solar collector panel. However, several basic-unit panels are easily joined at their flanges 17 by simple butt welding, to produce panels of the desired width. The same joining method can be used to provide connector sockets or plugs at the outer ends of the manifolds.

For best results, the tubular elements 5 and the manifold 16 to be molded on should consist of the same type and grade of plastic material to avoid possibly destructive stresses due to differential shrinkage and/or thermal expansion.

Figure 11:
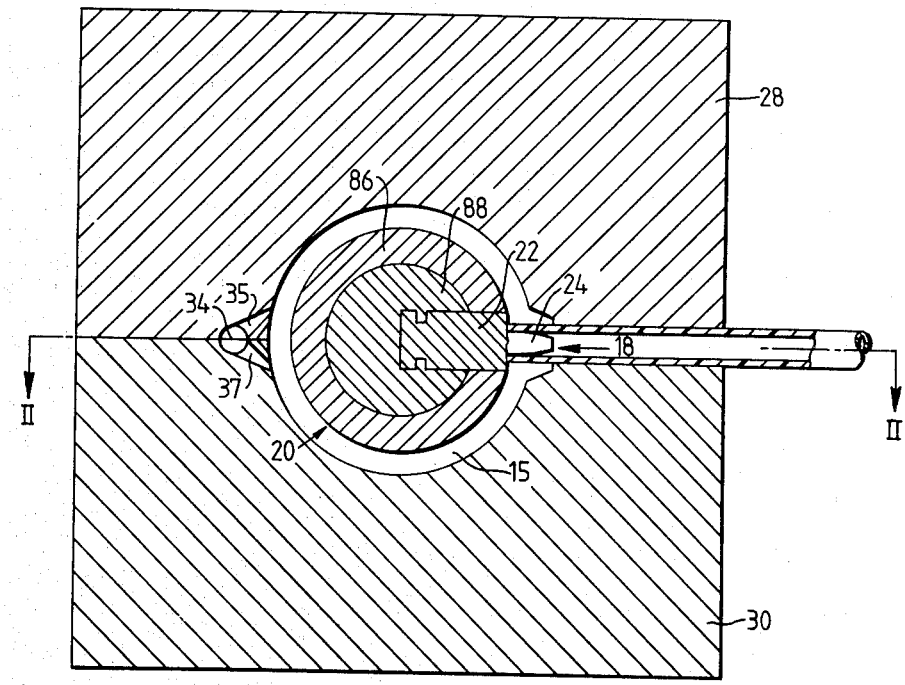
FIG. 11 is a cross-sectional view of a mold for producing the solar-collector panel of FIG. 8.

FIG. 11 illustrates a pre-injection stage of the preferred method, as well as the apparatus whereby in a single injection step, a plastic manifold 16 is injection-molded onto a panel-forming plurality of juxtaposed, hollow elements, preferably the elements shown in FIG. 2.

There are seen in FIG. 11 a core rail 22 which constitutes a part of a core means 20 defining the shape of the interior space of the final manifold 16. The core means 20 comprises, apart from the core rail 22, also a core jacket 86 and an extractor member 88. Further seen are a first mold member 28 and a second mold member 30 between which, in the pre-injection stage shown, the ends of the set 2 of tubular elements 5 (FIG. 2) are clamped, after the comb-like protrusions 18 of the core rail 22 have been introduced into these elements 5. In the stage shown, the two mold members 28 and 30, together with the core means 20 define the cavity 15 for the manifold 16, into which cavity, in the subsequent stage, the plastic material is injected via the central runner 34 and the upper- and lower-mold gates 35 and 37, respectively.

The next step involves removal of the core means 20. It is with this step that the difference between the previous method and apparatus, and the preferred method and apparatus becomes most apparent: whereas in the previous method and apparatus the first core 20 of FIG. 6 or 7 can be easily withdrawn together with its back-up plate 26 in a direction radial with respect to the manifold, and the second core 38 of FIG. 5 is easily extracted in the axial direction thereof, the core means 20 of FIG. 11 cannot be axially extracted as long as the fingers 24 of the protrusion 18 are still inside the ends of the plastic panel elements 5. These fingers 24 and the core rail 22, on the other hand, cannot be readily withdrawn in the radial direction.

The mechanism which, in a first step, radially withdraws the fingers 24 from the ends of the tubular panel elements 5 and, in a second step, axially extracts the entire core means 20, will be explained in the following.

Figure 12:
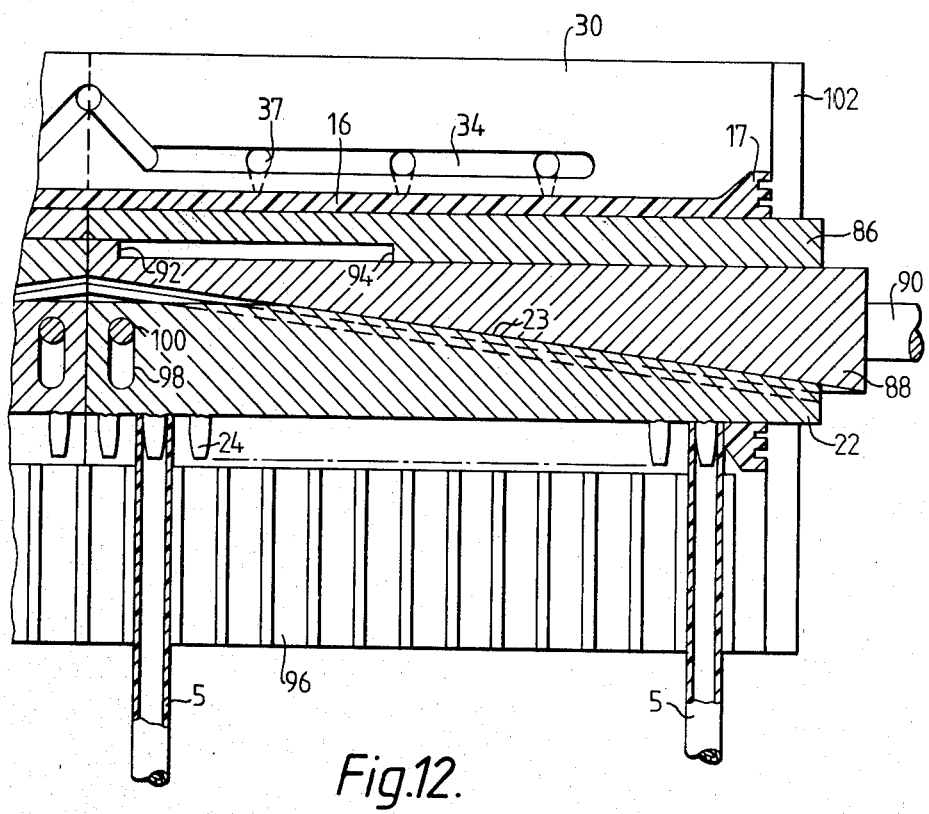
FIG. 12 is a cross-sectional top view of the mold of FIG. 11, along plane II—II.
Figure 13:
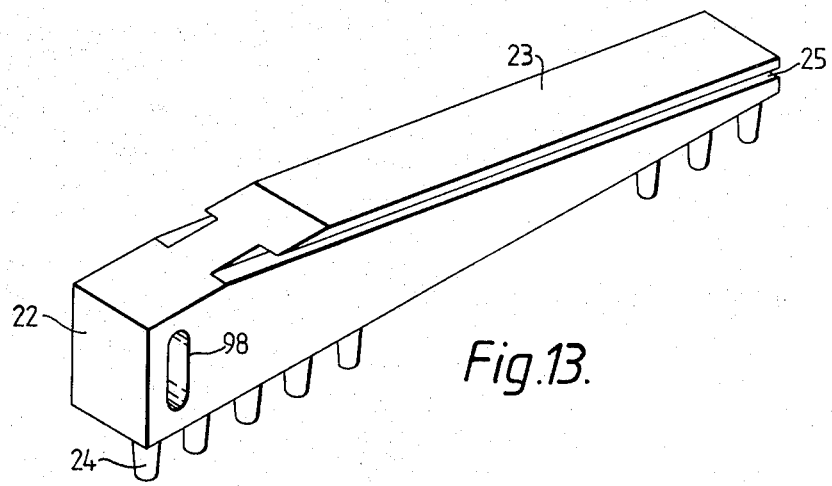
FIG. 13 is a perspective view of the core rail of FIGS. 11 and 12.

As mentioned before, the core means 20 (FIG. 11) comprises three parts: the core rail 22, the core jacket 86 and the extractor member 88. All three components are shown in FIG. 12, which is a top view of the mold of FIG. 11, in partial cross section along plane II—II. The core rail 22 which carries the fingers 24 and is seen to better advantage in FIG. 13, has a partly slanting edge 23 and a groove 25 cut in each of its major surfaces, adjacent and parallel to the slanting edge 23. The rail 22 and its grooves 25 fit an equally slanting T-slot cut into the extractor member 88 which is connected via a shaft 90 to a pneumatic cylinder (not shown). The extractor member 88 moves freely in the core jacket 86, until an abutment shoulder 92 of the extractor member 88 hits a matching abutment shoulder 94 in the core jacket 86. Any further movement to the right will also drag along the jacket 86. FIG. 12 shows the mold (which has two symmetrical halves, of which only the right half is fully shown) after injection. The fingers 24 are still inside the tubular elements 5 (of which only two are shown) which, beyond the fingers 24, are supported in semi-cylindrical grooves 96 provided in both mold parts 28 and 30 (FIG. 11).

A timing device (not shown) now actuates the pneumatic cylinder, which causes the extractor member 88 (FIG. 14) to be pulled to the right. (The extractor member of the left mold half is, of course, pulled to the left). During this first extraction stage, the core jacket 86 is immobilized by means not shown, so that the extractor member 88 can move only until its abutment shoulder 92 hits the abutment shoulder 94 of the core jacket 86. The core rail 22, being provided with an elongated hole 98 through which it is connected to the core jacket 86 by means of a pin 100 can move relative to the core jacket 86 only in a radial direction, i.e., a direction normal to the axis thereof, for a distance determined by the length of the elongated hole 98. Being connected also to the extractor member 88 via the grooves 25 and the T-slot in the extractor member 88, any axial movement of the latter will result in a radial movement of the core rail 22. As can be seen from FIG. 14, the axial movement of the extractor member 88 has caused a radial movement of the core rail 22, resulting in the withdrawing of the fingers 24 from the tubular panel elements 5.

This withdrawing movement having been completed, the means immobilizing the core jacket 86 are deactivated and the continuing movement of the extractor member 88 now also carries along the rest of the core means 20, that is, the core jacket 86 and the core rail 22. At the same time, the side plates 102 which mold the faces of the manifold flanges 17 (FIG. 8) are also withdrawn, the first mold 28 is lifted and the molded manifold 16 knocked out of the mold by ejector pins (not shown).

Another form of the basic-unit collector panel produced by the method according to the invention uses the panel consisting of two sheets integrally connected by a plurality of spaced ribs, shown in FIG. 3. In this case, the protrusion 18 of the core rail 22 would not consist of distinct fingers 24, but of a continuous strip of a thickness corresponding to the height of the ribs 10. In the zone of this strip, the ribs 10 would have to be removed.

It will be evident to those skilled in the art that the invention is not limited to the details of the foregoing illustrative embodiment and that the present invention may be embodied in other specific forms without departing from the essential attributes thereof, and it is therefore desired that the present embodiments be considered in all respects as illustrative and not restrictive, reference being made to the appended claims, rather than to the foregoing description, and all changes which come within the meaning and range of equivalency of the claims are therefore intended to be embraced therein.

What is claimed is:

1. A method for injection-molding at least a first part of a plastic manifold element onto an extruded, panel-forming plurality of juxtaposed, hollow elements, comprising the steps of:
   introducing into one set of ends of said plurality of hollow elements protrusion means extending from a core means, said core means defining the shape of at least part of the interior space of the final manifold to be formed;
   clamping the region of said set of ends accommodating said protrusion means between a first and a second mold member, which two members, together with said core means, delimit the cavity of at least part of said final manifold;
   injecting plastic material into said cavity;
   removing said core means, and
   removing said first and second mold members, whereby during the injection-molding process a strong bond is formed at the interface between the material of said plurality of juxtaposed, hollow elements and the material of the manifold being formed.

2. The method as claimed in claim 1, wherein said extruded, juxtaposed hollow elements are tubular.

3. The method as claimed in claim 2, wherein said tubular elements are connected to one another by a web extending in the longitudinal direction, being the direction of extrusion.

4. The method as claimed in claim 3, wherein said connective web is of a shape permitting the center distance of any pair of adjacent tubular elements to be slightly varied by elastic deformation of said web.

5. The method as claimed in claim 2, wherein said tubular elements are separate, nonconnected extruded tubes.

6. The method as claimed in claim 1, wherein said extruded, panel-forming plurality of juxtaposed, hollow elements consists of at least two sheets integrally connected by a plurality of spaced ribs extending in the longitudinal direction, being the direction of extrusion.

7. The method as claimed in claim 1, wherein said core means is a first core, and said protrusion means is a comblike edge portion of said first core, being formed by a plurality of teeth substantially fitting the insides of said hollow elements.

8. The method as claimed in claim 7, further comprising the steps of:
   introducing into the trough-like recess left by said first core a second core, a first portion of which substantially fits said trough-like recess, and a second portion of which complements the body of said first core, to define the shape of the complete interior space of said final manifold;
   mounting a third mold member which, together with said second portion of said second core and with the faces of the already molded first half of said manifold, constitutes the cavity of the second half of said manifold;
   injecting plastic material into said second-half cavity;
   removing said first, second and third mold members, and extracting said second core.

9. An apparatus for injection-molding a plastic manifold onto an extruded, panel-forming plurality of juxtaposed, hollow elements, which apparatus comprises: core means defining the shape of the interior space of the final manifold to be formed, protrusion means extending from said core means, which protrusion means is designed to substantially fit and fill at least one end section of said hollow elements to prevent the collapsing thereof during injection-molding of said manifold thereon, said core means comprising a core rail carrying said protrusion means, an extractor member in which said core rail is slidably arranged, and a core jacket substantially surrounding said extractor member, said core jacket, together with a portion of said core rail, defining the interior space of said final manifold.

10. The apparatus as claimed in claim 9, wherein a first and second mold member are provided which, together with said core means, delimit the cavity of said final manifold.

11. The apparatus as claimed in claim 9, wherein drive means are provided to impart to said extractor member an axial movement whereby, in a first stage, said protrusion means carried by said core rail is withdrawn from the end sections of said hollow elements and, in a second stage, said core rail together with said protrusion means and said core jacket are removed from the interior of said final manifold.

12. The apparatus as claimed in claim 9, wherein said protrusion means is a continuous strip.

* * * * *